Figure 1:
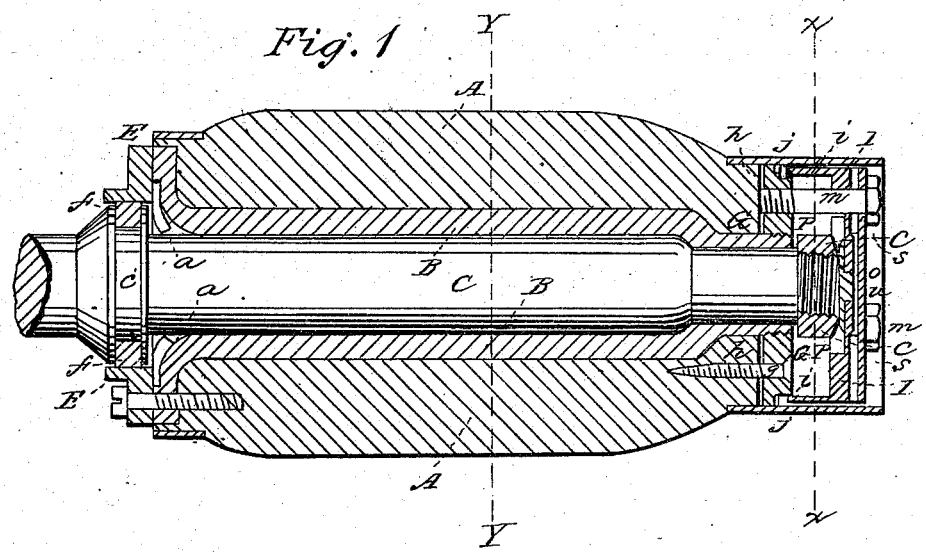
Figure 2:
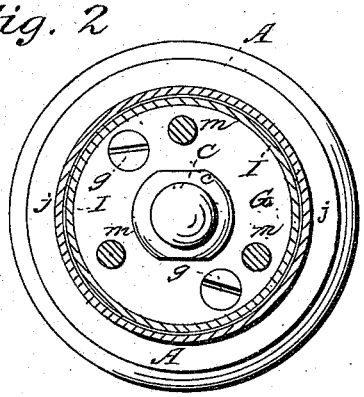
Figure 3:
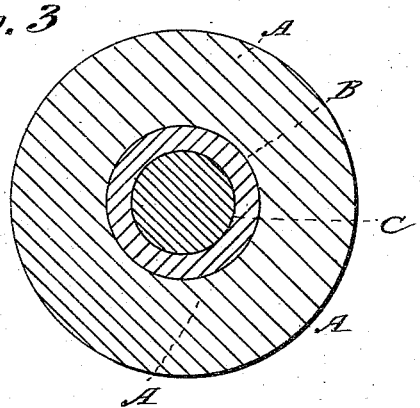

G. B. DURKEE.
Carriage Axle-Box.

No. 103,161. Patented May 17, 1870.

Witnesses:
Jno. J. Bonner
Victor H. Becker

Inventor:
Geo. B. Durkee
by Forbush & Hyatt
Attys

United States Patent Office.

GEORGE B. DURKEE, OF ALDEN, NEW YORK.

Letters Patent No. 103,161, dated May 17, 1870.

IMPROVEMENT IN AXLE-BOXES FOR CARRIAGES.

The Schedule referred to in these Letters Patent and making part of the same.

I, GEORGE B. DURKEE, of Alden, in the county of Erie and State of New York, have invented certain Improvements in Axle-Boxes for Carriages, of which the following is a specification.

The invention consists—

First, in the combination and arrangement at the inner end of the hub of a rubber ring, to prevent the egress of the oil, with a leather packing, to prevent the ingress of dirt to the former.

Second, of a flanged nut on the outer end of the box of the hub, secured to the end of the hub with interposed packing, and arranged with a cap, forming an oil receptacle, and inclosing the end of the journal.

Third, in constructing this cap with a steel center, for the end of the journal to bear against, to prevent inward movement of the wheel on the journal, whereby the necessity of a shoulder for the purpose at the inner end of the hub is dispensed with, and the wear consequent therefrom is resisted by a steel surface, which can be readily replaced should it become worn out.

In the accompanying drawings—

Figure I is a longitudinal section.

Figures II and III are cross-sections, respectively, in lines $x\ x$ and $y\ y$.

Like letters of reference designate like parts in each of the figures.

A represents the hub of a wheel;

B, the axle-box therein; and

C, the journal or axle, provided with the usual nut $c$ at the outer end, and a grooved collar, $c'$ at the inner end.

$d$ is a rubber ring, clamped to the end of the box by means of the flanged rim E, and snugly fitting the axle, so as to prevent the outward escape of the oil, the bore of the box at the inner end being enlarged, so as to permit the rubber, as the wheel is slid on the axle, to assume the inclined position shown.

In the groove of the collar $c'$ is arranged a ring of leather, $f$, packing outward against the flange of rim E, and preventing the ingress of dirt to the rubber ring $d$, which it would soon wear away were no such means of excluding it provided.

G is a flanged or flattened nut, screwing on the outer end of the box, and fastened to the end of the hub by screws $g$, a rubber ring or packing, $h$, being interposed between the nut and the hub.

I is a cap, fitting within the hub band $j$, with its edge pressing against the packing $i$, arranged in a groove in the periphery of the nut G.

$u$ is the steel bearing-surface, secured to the center of the cap on the inside by screwing therein, or in any other suitable manner, as clearly shown. It may be made adjustable, or not, as desired.

When the cap is arranged and secured in place, the distance between this steel surface and the end of the box should be but a little greater than the length of the nut, so as to allow of only the necessary play for the wheel on the axle.

The cap I is secured to the nut G by screws $m$, the ends of which abut against the packing $h$.

To render the screw-holes in the cap oil-tight, I prefer to employ an outer plate or disk, O, and an interposed annular packing, $s$, the screws $m$ passing from the outside through both disk, packing, and cap, as clearly shown.

The oiling of the journal is effected by simply removing one of the screws $m$, and introducing the lubricating material, through the hole thereof, into the chamber P, formed by the cap, the packing $h$ preventing the passage of the oil through the screw-hole in the nut G to the end of the hub.

It is well known that the inclination or "dish" of the wheel causes it to tend to work inward on the axle, so as to cause considerable wear on the inner shoulder, usually employed to prevent this inward movement.

It is also well known that the oil or other lubricating material tends to work outward, leaving the inner shoulder, when one is employed, dry, while the rest of the axle may be sufficiently lubricated.

By the use of my improvements I am enabled to dispense with the use of such inner shoulder, and to bring the wear and friction against a steel surface which can be readily replaced or adjusted if it should become worn, and which is located at a point where it is certain to be kept perfectly lubricated.

The nut G and packing keeps the box securely in place, protects the end of the hub, and furnishes a means, in combination with screws $m$, for securing the cap in place.

The rubber and leather packing-rings $d\ f$, at the opposite end of the hub, keep that clean, while the combination of both devices enables the journal to be kept freely lubricated, without the possibility of the material escaping and soiling the ends of the hub or clothing which may accidentally come in contact therewith.

I do not claim forming an oil-cup or reservoir at the end of the hub by means of a cap, nor of introducing the lubricating material through a hole formed therein; but

What I claim as my invention is—

1. The combination of the rubber ring $d$, the flanged rim E, and leather packing $f$, arranged with the axle C and box B; as and for the purpose hereinbefore set forth.

2. The nut G and packing $h\ i$, arranged with the cap I, outer plate O, packing-ring $s$, and screws $m$, as and for the purpose hereinbefore set forth.

3. The steel surface $u$ of the cap, arranged as a bearing for the end of the journal, to prevent the inward movement of the wheel thereon, as and for the purpose hereinbefore set forth.

GEO. B. DURKEE.

Witnesses:
JAY HYATT,
JNO. J. BONNER.